United States Patent [19]

Kankaanpaa

[11] 3,996,098
[45] Dec. 7, 1976

[54] TWIN-WIRE PAPER MACHINE WITH COMMON WIRE PATH CONTROLS

[75] Inventor: Matti Kankaanpaa, Espoo, Finland

[73] Assignee: Valmet Oy, Finland

[22] Filed: Dec. 29, 1975

[21] Appl. No.: 644,445

Related U.S. Application Data

[63] Continuation-in-part of Ser. No. 493,704, July 31, 1974, which is a continuation-in-part of Ser. No. 344,260, March 23, 1973, Pat. No. 3,846,232.

[30] Foreign Application Priority Data

June 13, 1975 Finland .............. 1774/75

[52] U.S. Cl. .............. 162/273; 162/301; 162/369; 162/370
[51] Int. Cl.² .............. D21F 1/00; D21F 1/40; D21F 1/50
[58] Field of Search .......... 162/273, 274, 301, 303, 162/307, 314, 351, 369, 370, 203

[56] References Cited
UNITED STATES PATENTS

| | | | |
|---|---|---|---|
| 2,881,670 | 4/1959 | Thomas | 162/203 |
| 2,969,114 | 1/1961 | Baxter, Jr. | 162/301 X |
| 2,998,846 | 9/1961 | Hornbostel | 162/307 X |
| 3,746,613 | 7/1973 | Vauhkonen | 162/301 |
| 3,810,818 | 5/1974 | Arledter | 162/203 X |
| 3,876,498 | 4/1975 | Justus | 162/274 X |

Primary Examiner—S. Leon Bashore
Assistant Examiner—Richard V. Fisher
Attorney, Agent, or Firm—Steinberg & Blake

[57] ABSTRACT

A twin wire paper machine having structure for controlling the common path taken by the wire. A web-carrying wire and a web-pressing wire having a common path extending upwardly from a lower forming roll to an upper couch roll with the web which is formed being compressed between these wires while they travel along this common path, the web-carrying wire continuing to transport the web beyond the common path of the two wires. The forming and couch rolls define between themselves a space situated on one side of a straight line which is tangent to both of these rolls and which contacts the common path of the wires at the regions of these rolls. A wire deflecting roll structure is situated along the common path of the wires between the forming and couch rolls and is situated at least in part in the above space between the forming and couch rolls at the above side of the line tangent to these rolls, so that the wires while traveling along their common path are deflected also to the above side of the above tangent line into the space between the above rolls, whereby the extent to which the wires lap the forming and couch rolls is increased.

17 Claims, 8 Drawing Figures

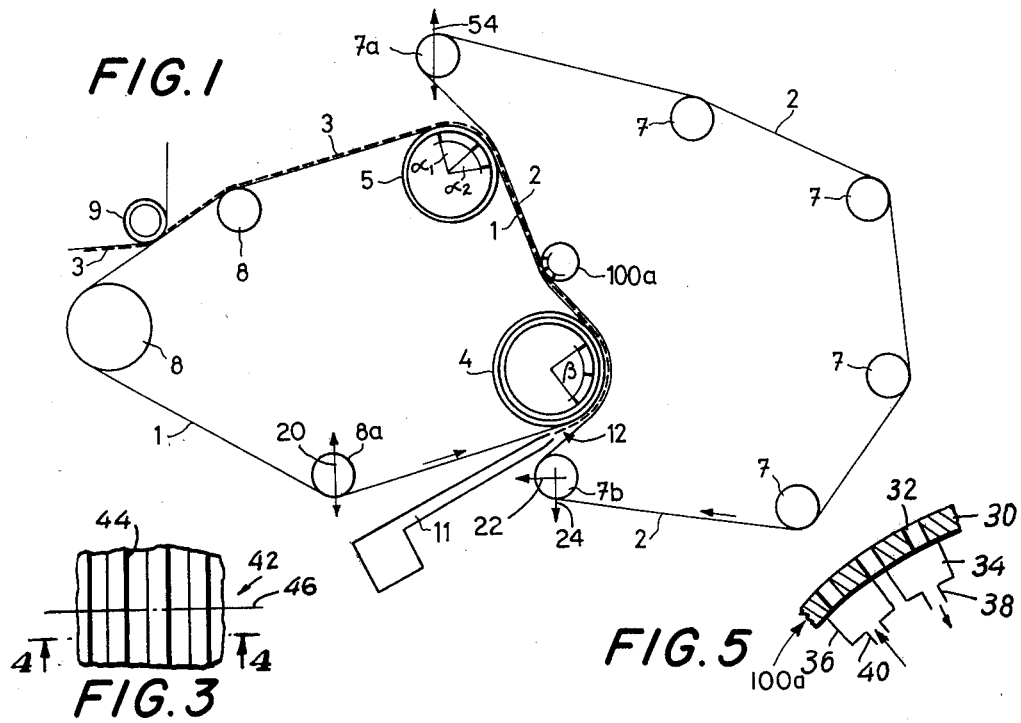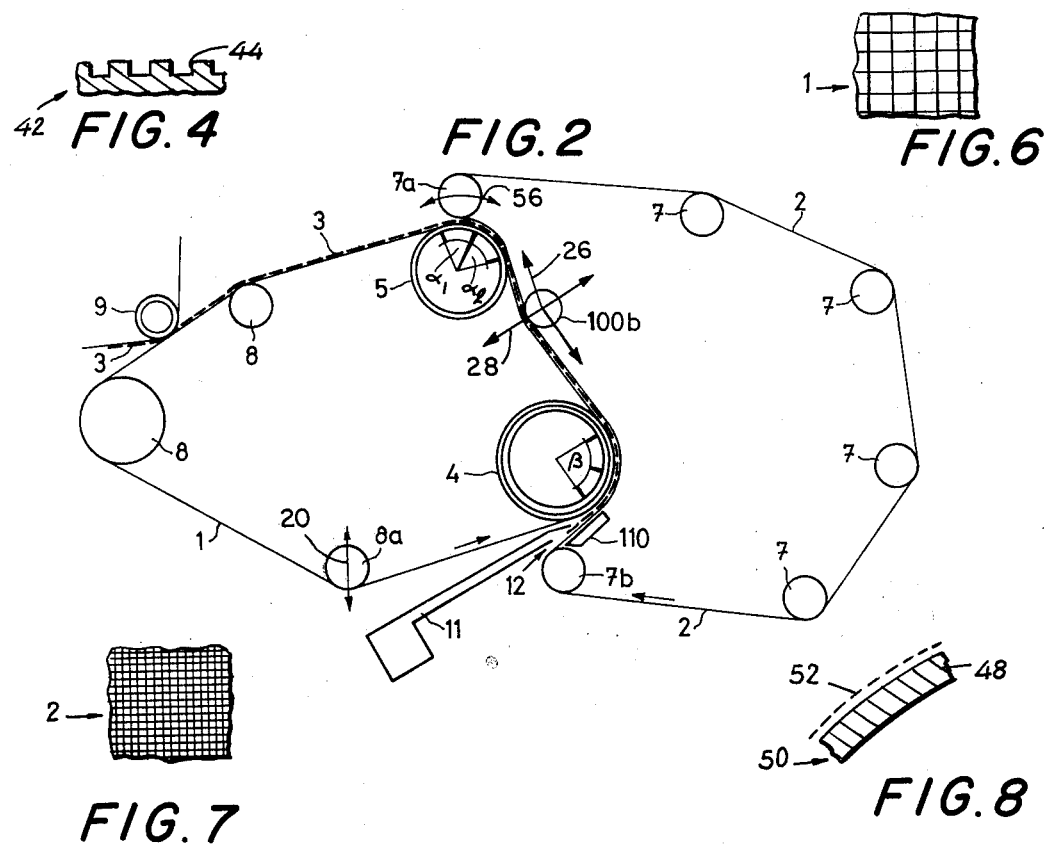

TWIN-WIRE PAPER MACHINE WITH COMMON WIRE PATH CONTROLS

CROSS REFERENCE TO RELATED APPLICATION

The present application is a continuation-in-part of copending application Ser. No. 493,704, filed July 31, 1974, and this latter application is itself a continuation-in-part of application Ser. No. 344,260, filed Mar. 23, 1973, and now U.S. Pat. No. 3,846,232.

BACKGROUND OF THE INVENTION

The present invention relates to paper-making machines and in particular to twin-wire machines wherein drainage or dewatering of the paper web during formation of the latter takes place to a large extent simultaneously through two wires one of which is a web-carrying wire and the other of which is a web-pressing wire, the web-carrying wire being that one of the pair of wires which continues to carry the web after the pressing wire detaches itself from the web. The web-carrying wire forms a loop within which are situated pair of suction rolls. The first of these rolls in the direction of travel of the web-carrying wire is a forming roll while the second of these rolls is a couch roll. The web-forming roll has a section sector for enhancing dewatering, and this latter sector extends through an angle of at least 90° and includes at least one suction compartment covered by both wires, with dewatering primarily achieved by the pressure between the wires.

Suitable guide rolls guide the web-carrying and web-pressing wires respectively along converging paths which meet at the forming roll at the beginning of the common path of travel of the pair of wires, and these converging paths of the pair of wires define a throat into which the stock in the form a of a suitable fiber suspension jet is delivered by the headbox.

From the beginning of the common path of the wires at the suction sector of the forming roll, the wires travel along this common path upwardly and preferably obliquely to the upper couch roll with the common path continuing at least up to the point where the carrying wire first contacts the couch roll.

In recent years there has been the development of a number of twin-wire machines wherein drainage from the web during formation thereof is attempted in a number of different ways so as to bring about dewatering simultaneously in opposed directions. It is clear that the speed with which dewatering takes place is appreciably increased by expedients of this type. Furthermore, the paper web which is produced in this way has more homogeneous structure than a paper web produced on a conventional Fourdrinier wire.

When twin-wire machines were first used, the objective was to achieve a symmetrical dewatering and the common path of the wires was vertical with the stock being fed to the upper end of the common path. However, twin-wire machines used at the present time differ from these earlier constructions by such features as the manner in which the stock suspension is delivered to the wires and the situation of the common path of travel of the wires, the web formation of course taking place while the web is compacted between the wires as they travel along their common path.

It has been found to be advantageous in most cases to increase the extent of dewatering by utilizing centrifugal force. This result is achieved by designing the twin-wire machine in such a way that the wires are compelled to travel along a curved path, particularly at an initial portion of the common path of travel of the wires, the latter initial portion being situated immediately subsequent to the headbox, and in this initial portion where centrifugal force is utilized at least in part the greatest part of the dewatering takes place.

A construction of the above general type is shown in British patent 993,837 wherein the wires are disclosed as passing around two rolls so that the common path of the wires is of a wave-shaped or S-shaped configuration.

However, this type of construction and variants thereof have the drawback that that one of the wires which directly engages the first roll is an inner wire at the first roll while at the second roll this same wire forms an outer wire which is not directly in engagement with the second roll. The result is that the wires necessarily undergo a displacement with respect to each other with an unavoidable damage to the fiber web which is in the process of being formed between the wires. A construction of this type disturbs the orientation of the fibers in the web and reduces the strength of the web.

There are also known constructions wherein both wires at their common path curve in one direction only, and of course the web which is formed between the wires curves in the same direction. U.S. Pat. No. 3,438,854 is exemplary of such constructions. However, such constructions have the drawback that the curved path of the wires is created by utilizing a relatively large number of differently constructed components which frictionally rub against the wires, these components, for example, having the form of a curved suction shoe or the like. Such components have a pronounced abrasive effect on the wires, and in addition they are disadvantageous in that considerable space is required for such components in the longitudinal direction of the paper machine.

SUMMARY OF THE INVENTION

It is accordingly a primary object of the present invention to improve the construction of twin-wire paper machines so that drawbacks as referred to above are avoided.

Thus, it is an object of the present invention to increase the dewatering capacity of the machine as well as to have an increased control with respect to the direction of dewatering while also improving the manner in which the wires are guided and the path taken thereby.

A more specific object of the present invention is to guide the wires along their common path of travel in such a way that the wires do not engage any stationary components which are capable of rubbing against the wires with an undesirable abrasive effect as referred to above.

It is furthermore an object of the present invention to provide a structure capable of controlling the common path taken by the wires in such a way that the extent to which the wires lap the forming and couch rolls can be regulated. It is in addition an object of the present invention to provide a construction capable of holding the wires together, as they travel along their common path, without an undesirable excessive tensioning of the wires so that the tendency of the wires to stretch, particularly in the case of plastic wires, can be greatly reduced. By holding the wires very tightly together as they travel along their common path the best possible structural and strength properties of the fiber web are assured.

Yet another object of the present invention is to provide a construction which will reduce the extent to which the wires can slip with respect to the forming and couch rolls.

According to the invention the twin-wire paper machine includes endless web-carrying and web-pressing wires respectively forming a pair of closed loops. Within the loop of the web-carrying wire is a lower forming roll and an upper couch roll, the web-pressing wire lapping part of the forming roll and couch roll together with the web-carrying wire so as to have with the latter a common path extending upwardly from the forming roll to the couch roll, and at the region where both wires lap the forming roll the latter has a suction sector enhancing dewatering of the web at an initial portion of the common path of travel of the wires, the web which is being formed of course being compressed between the wires as the latter travel along their common path. The forming and couch rolls define between themselves a space which is situated on one side of a straight line which is tangent to these rolls and which contacts the common path of the wires in the regions of these rolls. A rotary deflecting means which directly engages and which is situated within the loop of the pressing wire is situated along the common path of the wires at least partly in the above space for deflecting the wires as they travel along their common path into the latter space at the above side of the line which is tangent to the forming and couch rolls, so that in this way the extent to which the wires lap the forming and couch rolls is increased. The components, if any, engaged by the web-carrying wire as it travels along the common wire path and engaged by the pressing wire along the common path, such as the rotary deflecting means, are only freely rotatable components which in the same way as the deflecting means freely rotate in response to engagement with a wire, so that the wires never come into engagement with any stationary components or the like capable of producing a frictional rubbing or abrasive effect on the wires.

A wire deflecting roll is a roll which may be constructed as specified below and which serves to determine the path of the wires in the manner described in the description which follows.

BRIEF DESCRIPTION OF DRAWINGS

The invention is illustrated by way of example in the accompanying drawings which form part of this application and in which:

FIG. 1 is a schematic representation of one embodiment of the invention;

FIG. 2 is a schematic elevation of another embodiment of the invention;

FIG. 3 is a schematic fragmentary illustration of an outer grooved surface of a deflecting roll;

FIG. 4 is a fragmentary section of the structure of FIG. 3 taken along line 4—4 of FIG. 3 in the direction of the arrows;

FIG. 5 is a fragmentary sectional illustration of a deflecting roll provided with openings passing therethrough and having in its interior two compartments to cause an air flow through the openings; the direction of this air flow may be inward or outward;

FIG. 6 is a schematic fragmentary illustration on an enlarged scale of the mesh of the web-carrying wire 1;

FIG. 7 is a fragmentary schematic illustration on an enlarged scale of the mesh of the web-pressing wire; and FIG. 8 is a fragmentary sectional schematic illustration of a roll having a cage type body structure with a wire fabric covering.

DESCRIPTION OF PREFERRED EMBODIMENTS

FIGS. 1 and 2 each illustrate a web-carrying wire 1 in the form of a closed loop and a web-pressing wire 2 also in the form of a closed loop. The web-carrying wire is the endless wire which carries the paper web 3 beyond the pressing wire 2 subsequent to formation of the web between the wires 1 and 2, the web being picked up from the carrying wire 1 in a conventional manner for transportation and further treatment in the press section of the paper machine. Within the loop of the web-carrying wire 1 are a pair of suction rolls 4 and 5 each of which has in its interior at least one conventional suction compartment communicating with the suction system of the paper machine. The lower roll 4 is a web-forming roll situated at the initial or starting end of the common path of travel of the wires 1 and 2.

As the wires 1 and 2 approach the starting end of their common path of travel, these wires respectively travel along converging paths which meet at the starting end of the common path of travel and at their converging paths the wires 1 and 2 define between themselves a throat 12 into which the stock in the form of a suitable fiber suspension is supplied from the schematically illustrated headbox means 11. The headbox means 11 may be arranged in such a way that the jet of stock is directed from the headbox means directly to the starting point of the common path of travel where the wires 1 and 2 meet, and such an arrangement is illustrated in FIG. 1. However, it is also possible to position the headbox means 11 or a part thereof such as an adjustable slice lip in such a way that the jet of stock or fiber suspension issuing from the headbox is received first by one of the wires, so that the stock received in this way is transported by this one wire at least through a relatively short distance up to the point where the common path of travel of the wires starts. Preferably, with this latter type of arrangement the stock is delivered from the headbox means 11 first onto the pressing wire 2, and such an arrangement is illustrated in FIG. 2 where the stock from the headbox means 11 will first be deposited on the pressing wire 2 at a location in advance of the point where the wires 1 and 2 meet at the beginning of their common path of travel. In connection with this latter type of stock delivery, the pressing wire 2 is provided with a forming board 110 situated next to the pressing wire 2 at the underside thereof just beneath the location to which the stock is delivered from the headbox means 11. The forming board has a negligible abrasive effect on the wire. A stock-suspension delivery system of this type enables the twin wire machine to be operated with different types of controls as conventionally employed by paper makers when supplying stock onto a horizontal Fourdrinier wire in order to control the orientation of fibers in the paper or the formation of the sheet by way of, for example, regulating the velocity ratio between the wire and the stock jet.

A further possibility with respect to asymmetrical stock supply is to direct the fiber suspension jet toward the carrying wire 1 at a location thereof situated opposite the forming board 110 just in advance of the point where the throat 12 closes at the beginning of the common path of travel of the wires. A forming board may be located at this point too.

The forming roll 4 rotates at a speed which is sufficiently great to provide the forming roll 4 with a peripheral velocity greater than the stock jet velocity. Thus, in this way it is possible to avoid flooding, which is to say filling of the throat 12, with the undesired possibility of transverse currents occurring in the stock suspension which is supplied. The angle or size of the throat 12 and its orientation or direction can be regulated by changing the position or positions of wire-guiding rolls 8a and 7b, these being the rolls which determine the converging paths respectively taken by the wires 1 and 2 as they travel toward each other when approaching the forming roll 4, as illustrated in FIGS. 1 and 2. Thus, the double-headed arrow 20 represents schematically an adjusting means for adjusting the elevation of the guide roll 8a, this adjusting means having any known construction by means of which it is possible to change the elevation of the roll 8a. The arrow 22 in FIG. 1 represents schematically an adjusting means for adjusting the horizontal location of the roll 7b, while the arrow 24 schematically represents an adjusting means for adjusting the elevation of the roll 7b, and of course such adjusting structures can take any well known form. Of course it is to be understood that the adjusting means 20 for the roll 8a and the adjusting means 22, 24 for the roll 7b, schematically indicated by the arrows in FIG. 1 are also used with the construction of FIG. 2, Thus, by way of the adjusting means it is possible to control the throat 12. In addition, by way of these rolls and the possibility of adjusting the location thereof, particularly the roll 7b it is possible to regulate the tension in the wires 1 and 2 and in this way also the pressure with which the fiber web 3 is compressed between the wires can be regulated in this way.

Dewatering starts in a highly efficient manner in the throat 12 itself and continues thereafter at the web-forming roll 4. The water which is expressed from the fiber stock escapes partly outwardly toward the right, as viewed in FIGS. 1 and 2, as a result of centrifugal force, and partly into the web-forming roll 4 through holes formed in the wall of the roll 4, this latter dewatering into the web-forming roll 4 being brought about as a result of a vacuum which prevails in a suction compartment situated at the suction sector $\beta$ indicated in FIGS. 1 and 2. In the event that the dewatering brought about by the centrifugal force tends to produce at high speeds a two-sided type of sheet or a sheet which is asymmetrical or lacking in homogeneity throughout its thickness, then the pressing wire 2 is selected so as to have a sufficiently fine mesh (FIG. 7) but at the same time care is taken to provide adequate suction at the interior of the web-forming roll 4. This web-forming roll 4 has at its suction section $\beta$ one or more suction compartments in which the extent of vacuum can be adjusted in accordance with the dewatering conditions. It is to be noted that the suction sector $\beta$ extends preferably at least through 90°.

With respect to FIGS. 1 and 2, it will be seen that the endless web-carrying wire 1 travels in a counter-clockwise direction while the endless web-pressing wire 2 travels in a clockwise direction, so that along their common path extending upwardly from the forming roll 4 the wires 1 and 2 travel together toward the upper couch roll 5. The forming roll 4 and the couch 5 define between themselves a space which is situated at the left side, as viewed in FIGS. 1 and 2, of a straight line which is tangent to both of the rolls 4 and 5 at the right portions thereof, as viewed in FIGS. 1 and 2, where the wires are situated, with this tangent line of course intersecting the common path of the wires at least at the regions of the rolls 4 and 5. As is apparent from FIGS. 1 and 2, however, the wires 1 and 2 do not travel along this tangent line. Instead they extend from the rolls 4 and 5 into this latter space at the left side of the tangent line between the rolls 4 and 5. The travel of the wires 1 and 2 along their common path in this manner is brought about by way of a deflecting roll means including one or more rolls 100a, 100b, the latter rolls being respectively illustrated in FIGS. 1 and 2. As a result of this deflection of the wires 1 and 2 by way of the deflecting roll means 100a, 100b, it will be seen that the extent to which the wires lap the rolls 4 and 5 is increased so that the sectors of the rolls 4 and 5 along which the wires travel are increased. Thus, although only one deflecting roll 100a is shown in FIG. 1 and only one deflecting roll 100b is shown in FIG. 2, it is to be understood that with the invention more than one deflecting roll may be provided if desired. The double-headed arrow 26 of FIG. 2 schematically represents an adjusting means connected with the roll 100b for adjusting the latter in a direction parallel to a straight line normal to the axes of the rolls 4 and 5, or in other words a straight line connecting the centers of the rolls 4 and 5. The double-headed arrow 28 of FIG. 2 schematically represents an adjusting means for adjusting the roll 100b in a direction which is perpendicular to the direction of adjustment provided by the adjusting means 26. It is to be understood that the same adjusting possibility is provided for the roll 100a of FIG. 1. It will be noted, furthermore, that in FIG. 1 the roll 100a has had its location adjusted so that it is situated closer to the forming roll 4 than the couch roll 5. As a result the common path of wires 1 and 2 laps the roll 4 to an extent greater than the roll 5.

As is schematically indicated in FIG. 1, the deflecting roll 100a is provided in its interior with compartments for providing both suction and blowing, and the same construction may be utilized for the deflecting roll 100b. Referring in this connection to FIG. 5 it will be seen that the shell 30 of the roll 100a is fragmentarily illustrated in section. This shell or wall of the deflecting roll 100a is formed with a plurality of openings 32 which pass completely through the wall 30. Next to the inner surface of the wall 30 is a suction compartment 34 and a blowing compartment 36. The suction compartment 34 communicates with a pressure control means 38 schematically illustrated in FIG. 5 and taking the form of a suitable source of suction for providing in the compartment 34 an atmosphere which is at less than atmospheric pressure. The blowing compartment 36 communicates, as shown schematically in FIG 5, with a pressure control means 40 for providing for the atmosphere in the compartment 36 a pressure greater than atmospheric pressure. Thus blowing through the openings 32 can be brought about by way of the compartment 36 while suction through these openings can be brought about by way of the compartment 34, and as a result of these suction and blowing controls it is possible to regulate the direction and extent of dewatering to a degree greater than has heretofore been possible.

Of course, it is also possible to provide deflection rolls which do not have any suction or blowing compartments, and the roll 100b may be considered as having such a construction. Where the deflecting roll or rolls are not provided with interior suction or blowing compartments, the exterior surface of such a roll may be provided with openings similar to the openings 32 but extending only partly through the wall or shell of the roll. It is also possible to provide for this purpose a construction as shown in FIGS. 3 and 4 where a part of a roll 42 is illustrated, this roll 42 being utilized for the roll 100b, for example. Thus, the fragmentarily illustrated roll 42 of FIGS. 3 and 4 is provided at its exterior surface with circumferential grooves 44 situated substantially respectively in planes normal to the axis 46 of the roll 42. Although FIG. 4 schematically illustrates the grooves 44 as being formed directly in the wall of the roll 42, the roll 42 can carry at its exterior suface an elongated strip of metal or the like which is suitably profiled and wound around the roll to provide the equivalent of the grooves 44. It is also possible to use a dandy roll type roll as the wire deflecting roll. This roll 50 has a cage type body structure 48 covered with wire fabric 52, as shown schematically in FIG. 8. It will be noted that in the case of FIG. 2, the position of the roll 100b has been adjusted so that this deflecting roll is closer to the couch roll 5 than the forming roll 4, so that the angle of lap of the wires with respect to the roll 5 has been increased.

Of course, it is also possible to provide two deflecting rolls one of which is close to the forming roll 4 and the other of which is close to the couch roll 5, so that the angle of lap of the wires with respect to the rolls can be simultaneously increased at both rolls.

As is indicated in FIGS. 1 and 2, the endless web-pressing wire 2 is guided by a number of guide rolls 7. These rolls include the roll 7b referred to above and capable of being adjusted by way of the pair of adjusting means 22 and 24 so that in this way the angle and length of the throat 12 can be adjusted as required. These rolls 7 also include an upper guide roll 7a which in the case of FIG. 1 is capable of having its elevation adjusted by way of an adjusting means schematically represented by the double-headed arrow 54. As is apparent from FIG. 1, the couch roll 5 has in its interior a pair of successive suction sectors $\alpha_1$ and $\alpha_2$. With the particular adjustment for the guide rolls 7a provided in FIG. 1, the pressing wire 2 laps the couch roll 5 at the first suction sector $\alpha_2$ but not at the second suction sector $\alpha_1$. Thus the adjustment is such that the terminal portion of the common path of travel of the wires 1 and 2 ends at the location where the successive suction sectors meet in the roll 5. Thus while the suction in the compartment $\alpha_2$ will act on the web 3 while it is still compressed between the wires 1 and 2, at the next suction sector $\alpha_1$ the suction acts only through the web 3 and the wire 1 but not through the wire 2 which diverges away from the wire 1 at the location where the suction sectors $\alpha_1$ and $\alpha_2$ meet, as a result of the adjustment of the guide roll 7a by the adjusting means 54. Thus, with this arrangement the dewatering can be increased even at the terminal portion of the common path of travel of the wires 1 and 2 while additional dewatering is provided only through the wire 1 at the second suction sector $\alpha_1$.

It is also possible to provide for the guide roll 7a an adjusting means schematically represented by the double-headed arrow 56 in FIG. 2. With such an adjusting structure, the roll 7a can be adjusted circumferentially with respect to the axis of the couch roll 5. Thus, this adjustment will also enable the end point of the common path of travel of the wires to be determined, but with the arrangement of FIG. 2 the guide roll 7a can also function as a presser roll cooperating with the couch roll 5 in the manner shown in FIG. 2. Of course with the embodiment of FIG. 1 it is also possible by way of the adjusting means 54 to lower the guide roll 7a from the position shown in FIG. 1 until this guide roll 7a of FIG. 1 also cooperates with the couch roll 5 as a presser roll, its position on the couch roll being adjustable.

As has been indicated above, for particular different applications of the present invention it is important that that position of the deflecting roll means be capable of adjustment. The adjusting means 26 and 28 referred to above are provided for this purpose. Thus, the frame structure associated with the pressing wire 2 can carry suitable bars which extend parallel to the arrow 26 and which slidably carry the bearings for the roll 100b, and these bars can themselves be guided for movement along perpendicular bars which are parallel to the arrow 28, so that with such a construction it is possible to adjust the deflecting roll 100b in the manner described above.

As is apparent from the above description and from the drawings, it is possible to increase the extent of dewatering particularly during the initial phase of web formation by positioning the deflecting roll means in the manner illustrated in FIG. 1 according to which the angle of lap of the wires with respect to the forming roll 4 is increased so that for a given machine speed, wire mesh, and wire tension, all of which may remain constant, it is possible to increase dewatering by increasing the angle of lap of the wires with respect to the forming roll 4. Thus, this extent of lapping of the roll 4 by the pair of wires can be increased to a relatively great extent by way of adjusting the deflecting roll means.

Thus, by way of the deflecting roll means of the invention it is possible to change the common path of travel of the wires with this change of the direction of the common path of travel being such that, for example, the water which is pressed out of the web between the wires is thrown as a result of centrifugal force toward the interior of the pressing wire loop while the dewatering simultaneously takes place in the opposite direction into the suction sector of the forming roll. Under certain circumstances, as for example, when the paper machine is running at a relatively low speed or when a stock having easy-draining qualities is used, it is possible to utilize a normal wire guiding roll at this location. However, in most cases the deflecting roll means of the invention is quite different from other wire-guiding rolls. This difference over conventional arrangements is brought about by the function of the deflecting roll means of the invention. Thus, with the deflecting roll means of the invention the sandwich structure formed by the pair of wires and the fiber web therebetween is subjected to pressure. This pressing force provided by way of the deflecting roll means is increased considerably at the line of contact of the deflecting roll with the pressing wire. Of course, the increased pressure which is developed by way of the deflecting roll means of the invention could under certain circumstances act deleteriously on the web structure, for example, if the surface of the deflecting roll were impervious to water. However, it will be seen as described above, that in accordance with the invention the deflecting roll invariably has at its exterior surface openings of one type or another so that the exterior surface of the deflecting roll of the invention is capable of receiving in its cavities all of the water that is pressed out of the web, even if this amount of water which is pressed out of this location is exceptionally large. The openings at the exterior surface of the deflecting roll may be in the form of round holes or grooves as described above, and in this connection reference may be had to U.S. Pat. No. 3,718,959, wherein there is a disclosure of how it is possible to provide the deflecting roll with grooves as described above in connection with FIGS. 3 and 4. As has been set forth above in connection with FIG. 8, the deflecting roll may instead be of the dandy roll type and covered with a wire fabric 52. As has been indicated with respect to FIG. 5, the openings may pass completely through the shell of the deflecting roll in the case particularly where the interior of the roll has blowing or suction compartments, but also these openings can extend if desired only part way through the shell where there are no compartments in the interior of the deflecting roll. The particular type of deflecting roll structure which will be used depends on such factors as the machine speed, the thickness of the web which is being formed, the freeness or drainage capability of the paper stock, etc.

At the region where the pressing wire travels into engagement with the deflecting roll, a so-called blowing phenomenon may occur as a result of the rotary movement of the deflecting roll. This latter rotation of the deflecting roll may cause an air flow into the throat or gap between the pressing wire and the exterior surface of the deflecting roll. In order to avoid this phenomenon, if it appears to be undesirable, it is advantageous to use for the deflecting roll means a structure as shown in FIGS. 1 and 5 so that by way of a suitable suction compartment it is possible to eliminate air pressure at this location.

Moreover, by way of the deflecting roll it is possible to influence the extent to which the dewatering is symmetrical in opposed directions with respect to the web, and for this purpose the arrangement as shown in FIG. 5 is particularly suitable where there is a compartment such as the compartment 36 in which a pressure greater than atmospheric pressure prevails. By way of this latter feature it is possible to bring about a regulated blowing at the line of contact between the pressing wire and the deflecting roll, with this regulated blowing increasing the dewatering in the same direction as the dewatering action which is brought about by way of centrifugal force at this particular location, so that in addition to the drainage resulting from centrifugal force there is drainage resulting from the blowing action.

As has been pointed out above, the main part of the dewatering occurs at the web-forming roll 4. One of the primary features of the present invention resides in the fact that at the sector where the wires lap the forming roll 4, the extent of lap can be increased by way of the deflecting roll means of the invention. Moreover, by way of the deflecting roll means of the invention it is possible, to an extent greater than other twin-wire machines, to control the tension of the wires which is a further important factor in connection with the drainage from the web.

Of course, drainage from the web is also provided, but to a smaller extent, at the couch roll as a result of the suction prevailing in the suction sector thereof. However, by way of the deflecting roll means of the invention it is also possible, if necessary, to increase the extent to which the wires lap the couch roll so as to enlarge the lapping of the wires with the couch roll and thus enlarge the area at which suction prevails to enhance dewatering at the couch roll. This enlarging of the sector of lap at the couch roll is possible by way of the adjustment of the upper guide roll 7a, as described above, and the roll 7a being adjusted, for example, in the case of FIG. 2 toward the left in order to increase the angle of lap of the pressing wire with respect to the couch roll.

In the case where the web-forming roll 4 and the couch roll 5 are approximately of the same diameter and where the deflecting roll means is in the form of a single deflecting roll situated approximately midway between the rolls 4 and 5, the sector which is lapped by the wires is increased on both rolls 4 and 5 to the same extent as a result of the deflection of the wires by way of the deflecting roll. In the event that it is desired to increase the lap at the forming roll to an extent greater than that at the couch roll, it is only necessary to shift the deflecting roll toward the forming roll. On the other hand, if it is important to increase the lap at the couch roll, then it is only required to shift the deflecting roll toward the couch roll.

The change in direction of the common path of travel of the wires achieved by way of the deflecting roll structure of the invention can be expressed as the angle between the wires and the tangent which is common to the rolls 4 and 5 at the regions where the wires engage the latter. The most advantageous angle will depend upon a number of factors such as the paper machine speed, the fiber material which is used, the basis weight of the sheet which is to be produced, etc.

In the even that it is desired only, in accordance with the invention, to hold the pressing wire and web-carrying wire tightly together as they travel from the forming roll to the couch roll, it is sufficient if the above angle is between 2° and 5°, approximately. If it is desired to attempt to increase the dewatering rate as a result of centrifugal force by way of the deflecting roll, then this angle must be considerably increased. It is to be noted, however, that at higher machine speeds a smaller angle will be sufficient than at lower machine speeds.

In an experimental paper machine which has been constructed in accordance with the present invention for testing the operation of the structure of the invention, the deflecting roll had a diameter of 800 mm and was preferably situated so that its axis was on or very close to a tangent line drawn to the forming roll, which had a diameter of 1635 mm, and to the couch roll which had a diameter of 1300 mm. Thus, with this construction the common tangent to the forming and couch rolls passed through the axis of the deflecting roll so that one-half of the latter roll extended into the space between the forming and couch rolls at the left side of this tangent line, as viewed in FIGS. 1 and 2. The distance between the centers or axes of the rolls 4 and 5 in this particular construction was 3500 mm, so that the common path of travel of the wires deviated 500 mm from said common tangent line, due to effect of the wire deflecting roll. Thus, the angle between the common tangent to the rolls 4 and 5 and the direction of the wires as they travel upwardly from the forming roll in this particular case was approximately 12°. The sectors covered by the wires on the forming roll was increased to the same extent, which is to say by 12°. Inasmuch as the suction sector without the deflecting roll of the invention corresponds to an angle of 90°, an increase of 13 percent in the extent of lap of the section sector was achieved. The deflecting roll was situated at a location where it was equidistantly located from both the rolls 4 and 5. Thus, the increse in the extent to which the suction sector of the couch roll was lapped by the wires was on the same order as the increase achieved at the forming roll. The angle between the portions of the wires traveling toward and away from the deflecting roll was approximately 25° with this particular construction of the experimental paper machine.

As is well known, the extent of dewatering at the couch roll can be increased by way of a presser roll, and according to a further feature of the invention it is possible to arrange the guide roll 7a so that it functions also as a presser roll having an adjustable position, as described above. However, for producing certain grades of paper it is not desirable to press the web at the couch roll excessively. In this case it is advantageous to guide the pressing wire in such a way that it laps the couch roll at its suction sector only to such an extent that the web which has been formed detaches itself from the pressing wire and remains on the web-carrying wire.

As is schematically shown in FIGS. 1 and 2, a suitable pick-up roll 9, which may be situated in a suitable felt loop, is provided for detaching the web 3 from the carrying wire 1 so that the web 3 can then be delivered to the press section of machine.

As is apparent from a comparison of FIGS. 6 and 7, the pressing wire may have a mesh finer than that of the carrying wire 1. As may be seen from FIG. 2, roll 7a may be adjusted to terminate the common path at the second suction sector of the couch roll.

What is claimed is:

1. In a twin-wire paper machine, a web-carrying wire and a web-pressing wire for pressing a web during formation thereof between said web-carrying wire and said web-pressing wire, both of said wires respectively forming closed loops, and a rotary web-forming roll as well as a rotary couch roll situated in the closed loop of said web-carrying wire with said couch roll being situated at an elevation higher than said forming roll and said wires both traveling along a common path upwardly from said forming roll to said couch roll while said pressing wire presses a web traveling along said common path between said carrying wire and pressing wire with said carrying wire continuing the transport of the web beyond said pressing wire where said web-carrying wire travels beyond said couch roll, said web-forming roll having a suction sector situated along said common path of both wires for enhancing dewatering of a web at an initial portion of said common path where said suction sector is located, a pair of guide rolls respectively situated in said loops and respectively engaging said wires for guiding the latter for movement toward each other respectively along converging paths which meet at said web-forming roll to determine the beginning of said common path, said converging paths of said wires forming a stock-receiving throat, and headbox means situated at the region of said throat for delivering into the latter stock from which a web is formed as the web travels between said wires along said common path, and rotary deflecting-roll means situated in the loop of said pressing wire along said common path between said forming and couch rolls and rotating only in response to travel of said pressing wire from said forming roll toward said couch roll, said forming and couch rolls defining between themselves a space situated on one side of a line tangent to said forming and couch rolls and contacting said common path at the region of said forming roll and at the region of said couch roll, said deflecting roll means being situated at least in part in said space and deflecting both of said wires into said space at said one side of said tangent line for increasing the extent to which said wires lap said forming and couch rolls, said wires as they travel along said common path from said forming roll to said couch roll, if they engage any components, engaging only freely rotatable structure such as said deflecting roll so that said wires do not frictionally rub against any components such as stationary components or the like as said wires travel along said common path.

2. The combination of claim 1 and wherein said deflecting roll means includes at least one deflecting roll formed at its exterior surface with cavities for receiving water from a web pressed between said wires as the latter travel along said common path.

3. The combination of claim 2 and wherein said deflecting roll has an axis and is formed at its exterior surface with a plurality of substantially circumferential grooves surrounding said axis, situated substantially in planes normal to said axis, respectively, and forming said cavities.

4. The combination of claim 2 and wherein said deflecting roll has an outer wall provided with said exterior surface and said cavities extending at least partly through said wall.

5. The combination of claim 2 and wherein said exterior surface of said deflecting roll is a wire fabric.

6. The combination of claim 4 and wherein said cavities are openings extending completely through said wall.

7. The combination of claim 6 and wherein said deflecting roll has in its interior next to an inner surface of said wall a stationary compartment with which said openings communicate as they travel past said stationary compartment, and pressure-control means communicating with the interior of said compartment for controlling the pressure of the atmosphere therein.

8. The combination of claim 7 and wherein a pair of said compartments are situated in the interior of said deflecting roll next to said inner surface thereof with said openings communicating with both of said compartments as said openings travel past said compartments, and a pair of said pressure-control means respectively communicating with said compartments, one of said pressure control means providing in one of said compartments a pressure greater than atmospheric pressure and the other of said control means providing in the other of said compartments a pressure less than atmospheric pressure.

9. The combination of claim 1 and wherein said headbox means directs the stock toward only one of said wires so that the stock first engages said one wire before the other of said wires before the location where said common path begins.

10. The combination of claim 1 and wherein said pressing wire has a mesh finer than the mesh of said carrying wire.

11. The combination of claim 1 and wherein one guide roll situated in the loop of said pressing wire is situated in the region of said couch roll for guiding said pressing wire at the end of said common path away from said couch roll, said guide roll being spaced from said couch roll for guiding said pressing wire beyond the end of said common path from said couch roll to said guide roll along a path which diverges away from said carrying wire while the latter remains in engagement with said couch roll.

12. The combination of claim 11 and wherein said couch roll has in its interior a pair of successive suction sectors the first of which is situated along a terminal portion of said common path and the second of which is situated along that part of said couch roll which is lapped only by said carrying wire beyond the end of said common path, said guide roll which is situated within said loop of said pressing wire in the region of said couch roll having with respect to the latter a location for situating the end of said common path substantially at the location where said first suction sector ends and said second suction sector begins.

13. The combination of claim 1 and wherein said couch roll has in its interior a pair of successive suction sectors at a location where said carrying wire laps said couch roll, and a guide roll situated in said loop of said pressing wire at the region of said couch roll and guiding said pressing wire first across one of said suction sectors and then at least partly across the next suction sector so that said common path terminates at the region of the latter suction sector.

14. The combination of claim 1 and wherein said couch roll has in its interior at least one suction sector and a guide roll situated in the loop of said pressing wire in the region of said couch roll and acting as a presser roll for pressing said pressing wire toward said couch roll at the location of said suction sector therein.

15. The combination of claim 1 and wherein said headbox means cooperates with said throat for directing the stock first against one of said wires, so that the stock is engaged by both wires only at the beginning of said common path after the stock first engages said one wire, and forming board means supporting said one wire at the region toward which stock is directed by said headbox means.

16. The combination of claim 1 and wherein an adjusting means is operatively connected with said deflecting roll means for adjusting the latter in a direction parallel to a straight line which intersects and is normal to the axes of said forming and couch rolls.

17. The combination of claim 16 and wherein said adjusting means is also operatively connected with said deflecting roll means for deflecting the latter in the direction which is perpendicular to said straight line.

* * * * *